UNITED STATES PATENT OFFICE.

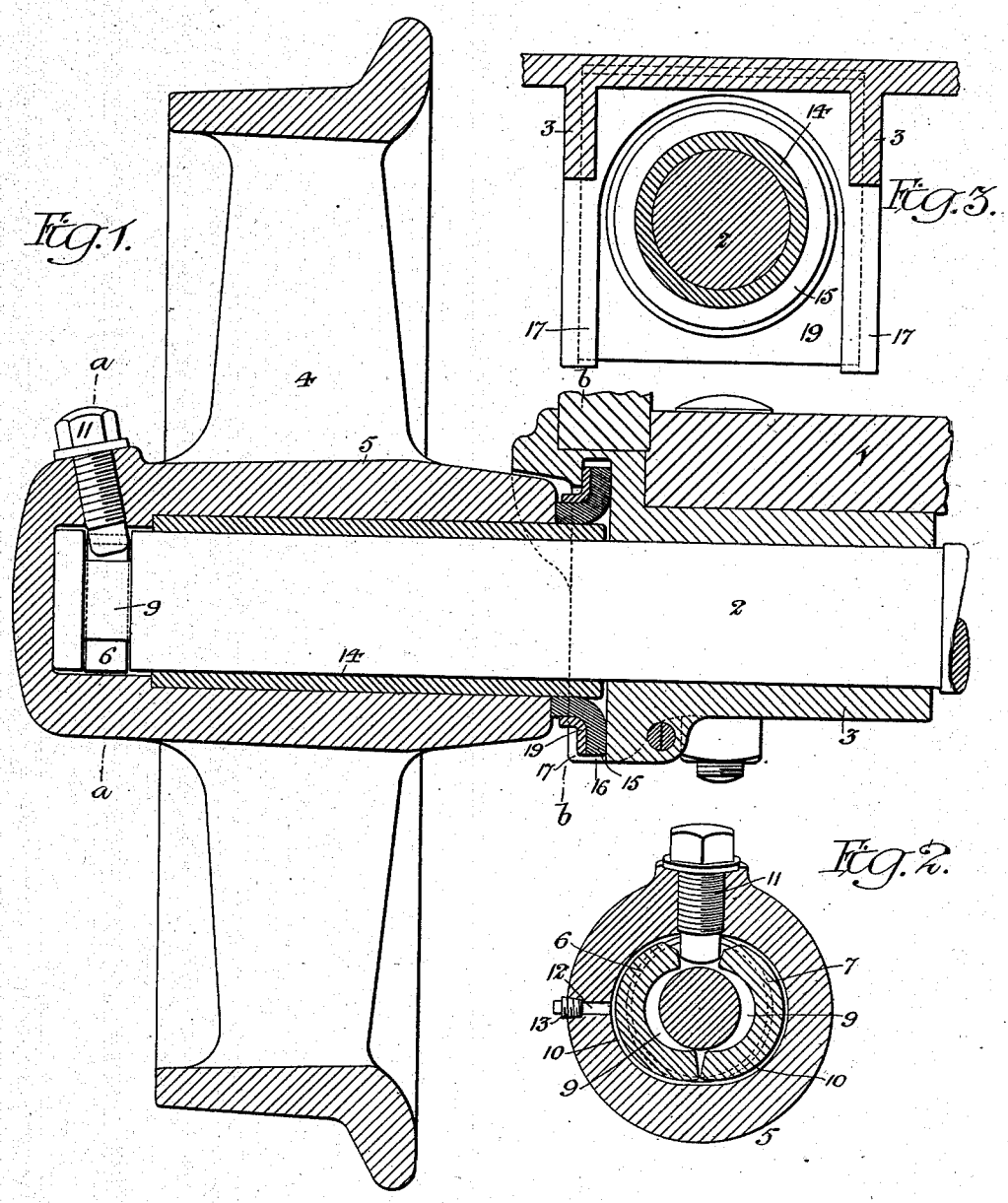

HARRY CLAY TAZEWELL, OF WILMINGTON, DELAWARE.

OILLESS BEARING FOR WHEELS.

SPECIFICATION forming part of Letters Patent No. 714,533, dated November 25, 1902.

Application filed January 3, 1902. Serial No. 88,270. (No model.)

*To all whom it may concern:*

Be it known that I, HARRY CLAY TAZE-WELL, a citizen of the United States, and a resident of Wilmington, Delaware, have invented certain Improvements in Oilless Bearings for Wheels, of which the following is a specification.

My invention relates to bearings for wheels such as are employed in mine-cars and other structures and in which it is desirable to dispense with lubrication, the object of my invention being to provide a journal for a wheel of this character with a bearing which while kept clean will run indefinitely without lubrication and also to provide means whereby such bearing can be kept clean by preventing the access of dust or other foreign matters to the bearing-surface.

In the accompanying drawings, Figure 1 is a vertical section of part of a mine-car, part of one of the axles of the same, and a wheel provided with a bearing in accordance with my invention. Fig. 2 is a transverse section on the line $a\ a$, Fig. 1. Fig. 3 is a view, partly in elevation and partly in transverse section, on the line $b\ b$, Fig. 1.

Part of the wooden structure of a mine-car is represented at 1 in Fig. 1 and part of one of the axles of said car at 2, said axle being secured to the under side of the car by means of a box 3, which is rigidly bolted thereto. The wheel 4 has a hub 5, which is closed at the outer end, so as to prevent any access of dirt or foreign matter to the journal of the wheel at that point, the wheel being free to turn on the axle and being retained in its proper longitudinal position thereon by means of a pair of locking-segments 6 and 7, adapted to coincide with grooves 9 and 10, formed, respectively, in the axle and wheel-hub, as shown in Fig. 2, the segments being held in the expanded or locking position by means of an interposed separator-screw 11 passing through an opening in the outer portion of the hub. When it is desired to remove the wheel from the axle, this separator-screw is partially withdrawn and the wheel is turned so that one of the segments is above the axle and will fall by gravity into the groove 9 of the same, the lower segment being then pushed up into the groove 9 by means of a pin or screw introduced through an opening 12 in the hub 5, which opening is normally closed by a plug 13. When both of the segments are contained within the groove in the axle, they are free from engagement with the groove 10 in the hub, and the latter can therefore be moved longitudinally on the axle in order to withdraw the wheel.

The hub 5 has an internal bushing consisting of a tube 14, composed of vulcanized fiber or some other form of cellulose which has been subjected to acid or alkaline treatment, so as to impart to it the parchment-like properties of this class of material, which I will refer to hereinafter simply as "vulcanized fiber," this being the name of one of the best known of the materials of this class. This bushing is driven into the hub of the wheel, so as to be securely confined thereto, the inner surface of the tube running in contact with the journal of the axle 2. I have ascertained by extended experiments that a bushing of this character will if the bearing-surfaces are kept clean run for an indefinite period without lubrication and without friction due to the absence of such lubricant, the bushing forming, in effect, a substantially frictionless non-lubricated bearing.

The closed outer end of the hub 5 effectually prevents the access of dirt to the bearing at that point, and in order to protect the inner end of the bearing I adopt the device shown in Figs. 1 and 2 and consisting of a ring-washer 15, of felt or equivalent flexible and elastic or semi-elastic material, this washer being bent so as to present two portions, one at a right angle to the other, the forwardly-projecting portion fitting snugly to the exterior of a portion of the vulcanized bushing 14, which projects beyond the inner end of the hub 5, the end of this forwardly-projecting portion of the washer abutting against the inner end of the hub, as shown in Fig. 1. The outwardly-projecting portion of the washer is contained within a slot 16, formed in the axle-box or hanger 3 of the car, this slot being open at the bottom, so that the washer can be readily introduced into the same from below, and having at the outer side an inwardly-projecting flange 17, whereby the longitudinal displacement of the washer is prevented. In the present instance the washer is stiffened and strengthened by combining therewith an angular metal ring 19, the outwardly-projecting portion of which is interposed between the corresponding portion of the washer and the flange 17, the inner face of the washer being pressed snugly into contact with the inner wall of the slot 16. In order, therefore, for any dust, dirt, or other foreign matter to gain access to the bearing-surface of the axle 2, it must pass either between the contact-faces of the felt washer and the hub and the projecting bushing or between the inner face of said felt washer and the inner wall of the slot 16, against which said washer is firmly pressed, a double joint being thus provided between the washer and the surface which rotates in contact therewith, and a single joint which may be pressed as tightly as desired between said washer and the non-rotating surface. By this means the bearing-surface is effectually protected, and the journal can be maintained indefinitely in good operative condition.

It is obvious that while I have shown my invention applied to an axle or shaft having a wheel it may be used with a pulley or other like device as well, and hence in the claims where I use the term "wheel" it is intended to include any form of that generic rotating body, such as a pulley.

I am aware that it has heretofore been proposed to combine strips of vulcanized fiber with bearings of graphite or other lubricating material; but I am not aware that the qualities of vulcanized fiber or equivalent preparations of cellulose as an antifriction-bearing capable of running indefinitely without lubrication have been known or suggested, and I therefore claim as my invention and desire to secure by Letters Patent—

1. The combination of a shaft or axle, a wheel turning thereon, a box carrying the axle, a tubular bushing interposed between the journal of the axle and the hub of the wheel and forming a bearing-surface, said bushing projecting from one end of the hub, and a felt washer having an outwardly-projecting portion and an upwardly-projecting portion, the outwardly-projecting portion having a bearing upon the end of the hub and also upon the outer surface of said projecting portion of the bushing, and the upwardly-projecting portion having a bearing upon the axle-carrying box, substantially as specified.

2. The combination of a shaft or axle, a wheel turning thereon, a tubular bushing projecting beyond the end of the wheel-hub, the axle-carrying box having a vertical slot therein, and a felt washer having a forwardly-projecting portion bearing against the end of the hub and upon the outside of the projecting portion of the bushing, and an outwardly-projecting portion bearing against the rear wall of said slot, substantially as specified.

3. The combination of the shaft or axle, the wheel turning thereon, the interposed bushing projecting beyond the inner end of the wheel-hub, the axle-carrying box having a vertical slot therein, the felt washer having a forwardly-projecting portion bearing against the end of the wheel-hub and upon the outside of the projecting portion of the bushing, and an outwardly-projecting portion bearing against the inner wall of the slot in the axle-carrying box, and a ring of angular cross-section interposed between the outwardly-projecting portion of the washer and the front wall of the slot, substantially as specified.

In testimony whereof I have signed my name to this specification in the presence of two subscribing witnesses.

HARRY CLAY TAZEWELL.

Witnesses:
THOMAS J. BOWEN, Jr.,
WALTER S. TAZEWELL.